United States Patent
Wei et al.

[11] Patent Number: 6,110,350
[45] Date of Patent: Aug. 29, 2000

[54] METHOD AND APPARATUS FOR ELECTROCHEMICALLY DEBURRING A DIESEL INJECTOR NOZZLE

[75] Inventors: Bin Wei, Clifton Park; John Peter Fura, Ballston Lake, both of N.Y.

[73] Assignee: General Electric Company, Schenectady, N.Y.

[21] Appl. No.: 08/975,135

[22] Filed: Nov. 20, 1997

[51] Int. Cl.[7] .................................................. B23H 9/00
[52] U.S. Cl. ...................................... 205/665; 204/224 M
[58] Field of Search ....................... 204/224 M; 205/640, 205/665, 672

[56] References Cited

U.S. PATENT DOCUMENTS

| | | | |
|---|---|---|---|
| 3,705,843 | 12/1972 | Sickels | 205/672 |
| 3,816,272 | 6/1974 | Joslin | 205/672 |
| 4,578,164 | 3/1986 | Matsui et al. | 204/129.55 |
| 5,026,462 | 6/1991 | Butterfield et al. | 204/129.55 |

FOREIGN PATENT DOCUMENTS

A 60-48215 3/1985 Japan ...................................... 205/665

*Primary Examiner*—Kathryn Gorgos
*Assistant Examiner*—Thomas H. Parsons
*Attorney, Agent, or Firm*—Douglas E. Erickson; Marvin Snyder

[57] ABSTRACT

Method and apparatus for electrochemically deburring a diesel injector nozzle workpiece having a gallery cavity and having a first fuel hole and an air hole intersecting the gallery cavity at a first location. A first electrode is inserted into the first fuel hole such that the electrode tip is near the first location. A post is inserted in the air hole into the gallery cavity. An electrolyte flow is directed through a first channel of the post to the gallery cavity and through a second channel of the post from the gallery cavity. A voltage potential is applied between the first electrode and the workpiece to remove burrs previously formed at the first location.

10 Claims, 2 Drawing Sheets

METHOD AND APPARATUS FOR ELECTROCHEMICALLY DEBURRING A DIESEL INJECTOR NOZZLE

FIELD OF THE INVENTION

The present invention relates generally to electrochemical deburring, and more particularly to a method and apparatus for electrochemically deburring a diesel injector nozzle workpiece.

BACKGROUND OF THE INVENTION

Diesel injector nozzles are usually cylindrically shaped and typically include a gallery cavity, a larger-diameter central air hole intersecting the gallery cavity at a central location, and three spaced-apart smaller-diameter fuel holes intersecting the gallery cavity at spaced apart locations which are separate from the central location. Diesel injector nozzles also include spray holes in fluid communication with the gallery cavity. Diesel injector nozzles are used in diesel engines, such as, but not limited to, large diesel engines which power locomotives. In operation, fuel is injected through the fuel holes to the gallery cavity, and pressurized air is injected through the air hole to the gallery cavity. The air and the fuel become mixed in the gallery cavity and the fuel-air mixture then exits the nozzle through the spray holes into a combustion chamber, as is well known to those skilled in the art.

During the manufacture of a diesel injector nozzle, typically the spray holes are drilled after the air holes, the fuel holes, and the gallery cavity have been created. In mechanically drilling the fuel holes in the diesel injector nozzle workpiece, burrs sometimes form at the intersection of the fuel holes with the gallery cavity. A known electrochemical deburring (ECD) technique for removing such burrs inserts an electrically-insulative sleeve into the air hole and then inserts a tool electrode through the open center of the sleeve such that the tip of the tool electrode is positioned in the gallery cavity and such that an annularly-cylindrical channel is defined between the tool electrode and the sleeve. Alternatively, the channel can be created in the tool electrode itself or in the sleeve itself. An electrolyte flow is directed through the channel to the gallery cavity and then through the fuel holes from the gallery cavity. A direct-current voltage potential is then applied between the tip of the tool electrode and the diesel injector nozzle workpiece. The effect is to remove metal, including the burrs, in the general vicinity between the tool electrode and the intersections of the fuel holes with the gallery cavity. A typical gap between the tool electrode and the intersections of the fuel holes with the gallery cavity in a large diesel injector nozzle is more than three millimeters.

With such a large gap between the tool and the burrs, the ECD process has to proceed under a low current density (as per Ohm's law and Faraday's law of electrolysis) which leads to a low metal removal rate. The large gap causes surface defects in the workpiece due to selective metal dissolution, surface pitting, and unwanted metal removal outside the immediate deburring area.

What is needed is a more efficient method, and improved apparatus for carrying out such a method, for electrochemically deburring diesel injector nozzle workpieces.

SUMMARY OF THE INVENTION

A first preferred method of the present invention is for removing burrs from a diesel injector nozzle workpiece having a gallery cavity, a smaller-diameter first fuel hole intersecting the gallery cavity at a first location, and a larger-diameter air hole spaced apart from the first fuel hole and intersecting the gallery cavity at a second location which is spaced apart from the first location, wherein the burrs are located generally at the first location. The first preferred method includes steps a) through c). Step a) includes the step of inserting an electrically-insulated first electrode having an electrically-exposed tip into the first fuel hole such that the tip is near the first location. Step b) includes the step of directing an electrolyte flow through the air hole to the gallery cavity and then through the air hole from the gallery cavity. Step c) includes the step of applying a voltage potential between the first electrode and the diesel injector nozzle workpiece.

A first preferred apparatus of the present invention is for removing burrs from a diesel injector nozzle workpiece having a gallery cavity, a smaller-diameter first fuel hole intersecting the gallery cavity at a first location, and a larger-diameter air hole spaced apart from the first fuel hole and intersecting the gallery cavity at a second location which is spaced apart from the first location, wherein the burrs are located generally at the first location. Such first preferred apparatus includes an electrically-conductive base, an electrically-insulative block, and an electrically-insulated first electrode. The block has a conduit and a post. The post has separated first and second channels, and the block has an electrolyte entrance and an electrolyte exit. The block is located on top of the base, and the diesel injector nozzle workpiece is able to be positioned (and preferably is positioned) on top of the block such that the post is inserted in the air hole into the gallery cavity. When the post is so inserted in the air hole, the first and second channels are in fluid communication with the first location, the electrolyte entrance is in fluid communication with the first channel, and the electrolyte exit is in fluid communication with the second channel. The first electrode has an electrically-exposed tip, wherein the first electrode is able to be positioned (and preferably is positioned) in the first fuel hole of the diesel injector nozzle workpiece with the tip near the first location and with the first electrode in electrical contact with the base through the conduit when the post is so inserted in the air hole.

Several benefits and advantages are derived from the invention. In the first preferred method and in the first preferred apparatus, the gap between the tool and the burrs (i.e., the distance between the tip of the first electrode and the first location, such first location being the intersection between the first fuel hole and the gallery cavity) is small. A typical gap is less than one millimeter compared to the over three millimeter gap of conventional methods and apparatus. With such a small gap between the tool and the burrs, the ECD process can proceed under a high current density (as per Ohm's law and Faraday's law of electrolysis) which leads to a fast metal removal rate. The small gap minimizes surface defects in the workpiece due to selective metal dissolution, surface pitting, and unwanted metal removal outside the immediate deburring area.

DESCRIPTION OF THE DRAWINGS

Prior Art

DETAILED DESCRIPTION OF THE INVENTION

Figure 1:
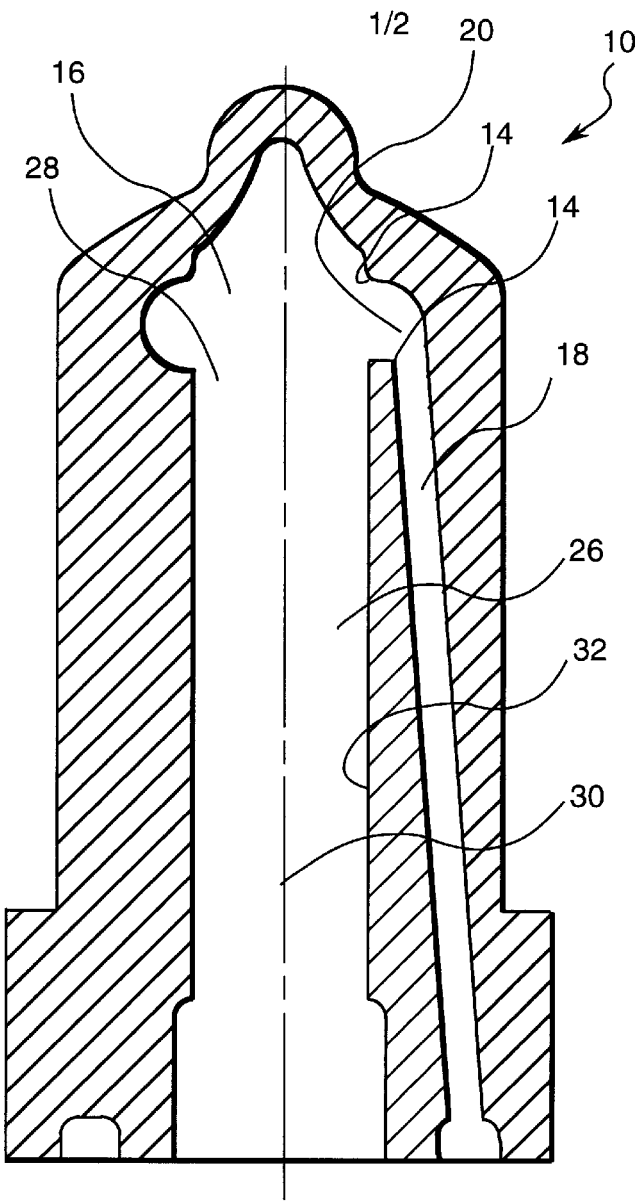
FIG. 1 is a schematic cross sectional view of a conventional diesel injector nozzle workpiece.
Figure 3:
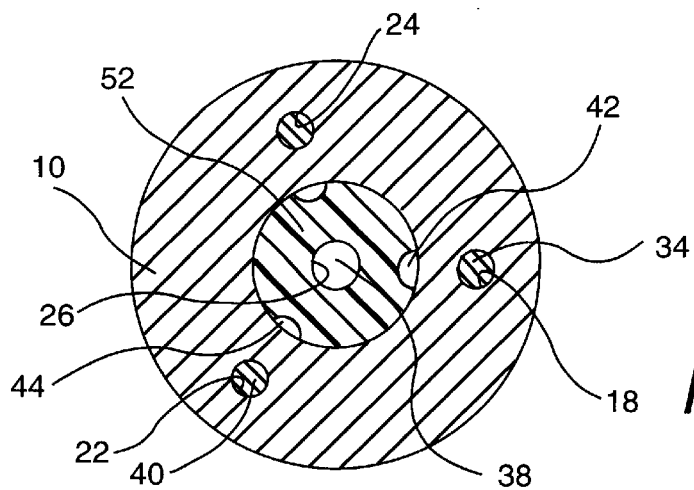
FIG. 3 is a cross sectional view, taken along arrows 3—3 in FIG. 2.
Figure 2:
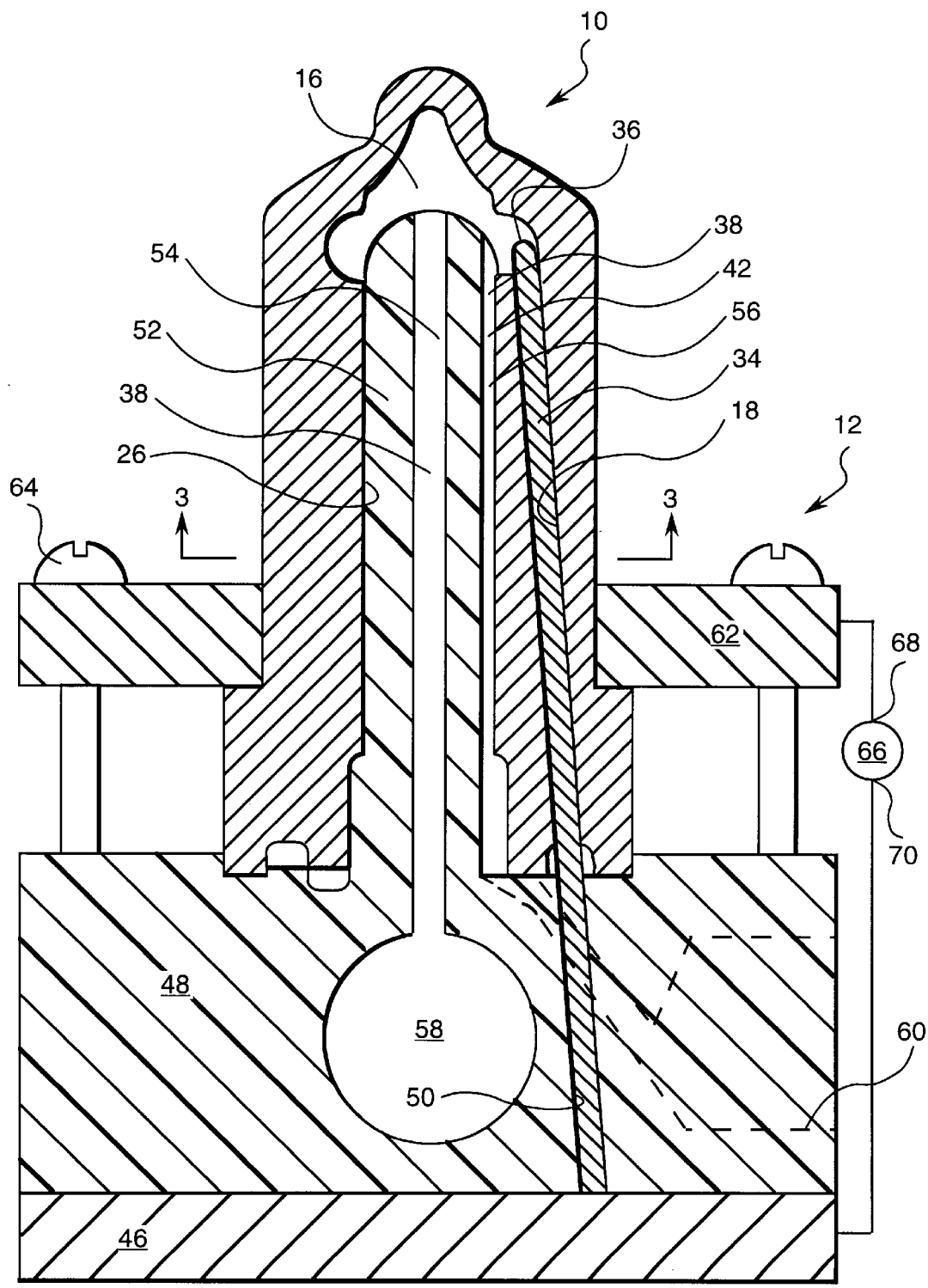
FIG. 2 is a schematic cross sectional view of a first preferred apparatus, with the workpiece of Prior Art FIG. 1 installed thereon, for carrying out a first preferred method of the invention for removing burrs from the workpiece.

Referring now to the drawings, a conventional diesel injector nozzle workpiece 10 is shown by itself in Prior Art FIG. 1 and is shown installed on a first preferred apparatus 12 of the invention in FIGS. 2 and 3. Apparatus 12 is for carrying out a first preferred method of the present invention. Such first preferred method is a method for removing burrs 14 from the diesel injector nozzle workpiece 10. Preferably, the diesel injector nozzle workpiece 10 consists essentially of steel.

The diesel injector nozzle workpiece 10 has a gallery cavity 16 and a smaller-diameter first fuel hole 18 intersecting the gallery cavity 16 at a first location 20. Preferably, the diesel injector nozzle workpiece 10 also has a second fuel hole 22 and a third fuel hole 24 as seen in FIG. 3, wherein all of the fuel holes 18, 22, and 24 were mechanically drilled leaving behind unwanted burrs, such as the burrs 14 located generally at the first location 20. It is noted that the second and third fuel holes 22 and 24 are generally identical to and spaced apart from the first fuel hole 18. The diesel injector nozzle workpiece 10 additionally has a larger-diameter air hole 26 spaced apart from the first fuel hole 18 and intersecting the gallery cavity 16 at a second location 28 which is spaced apart from the first location 20. Preferably, the air hole 26 has a generally cylindrical shape, a generally longitudinal axis 30 and a circumferential periphery 32. It is also preferred that the diesel injector nozzle workpiece 10 is devoid of spray holes (not shown in the figures) in fluid communication with the gallery cavity 16, such spray holes being required in a finished diesel injector nozzle, as is known to the artisan. In an exemplary application, the finished diesel injector nozzle is for use in a diesel engine which powers a locomotive. It is noted that the cross sectional views of Prior Art FIG. 1 and FIG. 2 are longitudinal cross sectional views in that the longitudinal axis 30 lies completely in the cross-sectioning cutting plane.

The first preferred method of the invention is a method for removing burrs 14 from a diesel injector nozzle workpiece 10 having a gallery cavity 16, a smaller-diameter first fuel hole 18 intersecting the gallery cavity 16 at a first location 20, and a larger-diameter air hole 26 spaced apart from the first fuel hole 18 and intersecting the gallery cavity 16 at a second location 28 which is spaced apart from the first location 20, wherein the burrs 14 are located generally at the first location 20. The method comprises the steps a) through c). Step a) includes the step of inserting an electrically-insulated first electrode 34 having an electrically-exposed tip 36 into the first fuel hole 18 such that the tip 36 is proximate the first location 20. To provide for the electrical insulation, the body surface of the first electrode 34 can be coated or wrapped with an electrically-insulating material (such as electrically-insulating paint, a plastic tube, plastic tape, or a chemical vapor deposit [CVD] electrically-insulating coating) for those portions of the body surface that would otherwise come into electrical contact with the walls of the first fuel hole 18. Step b) includes the step of directing an electrolyte flow 38 through the air hole 26 to the gallery cavity 16 and then through the air hole 26 from the gallery cavity 16. Preferably, the electrolyte is a $NaNO_3$ aqueous solution which is pumped through the air hole 26. Step c) includes the step of applying a voltage potential between the first electrode 34 and the diesel injector nozzle workpiece 10. The voltage potential is a direct current (DC) voltage potential applied in a continuous or pulsed mode.

In a preferred process, the diesel injector nozzle workpiece 10 also has a second fuel hole 22 which is generally identical to and spaced apart from the first fuel hole 18. In this process, step a) also includes the step of inserting an electrically-insulated second electrode 40 having an electrically-exposed tip into the second fuel hole 22, and step c) also includes the step of applying a voltage potential between the second electrode 40 and the diesel injector nozzle workpiece 10. Preferably, during steps a) through c), the diesel injector nozzle workpiece 10 is devoid of spray holes in fluid communication with the gallery cavity 16. In an exemplary construction, the air hole 26 has a generally cylindrical shape, a generally longitudinal axis 30, and a circumferential periphery 32, and step b) includes the step of directing the electrolyte flow 38 along the longitudinal axis 30 through the air hole 26 to the gallery cavity 16 and then generally longitudinally along the circumferential periphery 32 through the air hole 26 from the gallery cavity 16. Preferably, step b) includes the step of directing the electrolyte flow 38 in spaced apart first and second electrolyte subflows 42 and 44 generally longitudinally along the circumferential periphery 32 through the air hole 26 from the gallery cavity 16, wherein the first electrolyte subflow 42 and the first fuel hole 18 generally lie in a first plane, and wherein the second electrolyte subflow 44 and the second fuel hole 22 generally lie in a second plane which is different from the first plane.

The first preferred apparatus 12 of the present invention is apparatus for removing burrs 14 from a diesel injector nozzle workpiece 10 having a gallery cavity 16, a smaller-diameter first fuel hole 18 intersecting the gallery cavity 16 at a first location 20, and a larger-diameter air hole 26 spaced apart from the first fuel hole 18 and intersecting the gallery cavity 16 at a second location 28 which is spaced apart from the first location 20, wherein the burrs 14 are located generally at the first location 20. The first preferred apparatus 12 comprises an electrically-conductive base 46, an electrically-insulative block 48, and an electrically-insulated first electrode 34. The base 46 is required to be electrically-conductive which means it has an electrical resistivity no greater than 0.001 (ohm)(centimeter). The block 48 is required to be electrically-insulative which means it has an electrical resistivity at least equal to 400 (ohm)(centimeter). In an exemplary construction, the base 46 consists essentially of copper, and the block 48 consists essentially of polyvinyl chloride.

The block 48 has a conduit 50 and a post 52. The block 48 is disposed on top of the base 46. The diesel injector nozzle workpiece 10 is disposable (and preferably disposed) on top of the block 48 such that the post 52 is inserted in the air hole 26 into the gallery cavity 16. The post 52 has separated first and second channels 54 and 56, and the block 48 has an electrolyte entrance 58 and an electrolyte exit 60 (shown in dashed line). When the post 52 is so inserted in the air hole 26, the first and second channels 54 and 56 are in fluid communication with the first location 20, the electrolyte entrance 58 is in fluid communication with the first channel 54, and the electrolyte exit 60 is in fluid communication with the second channel 56. In an exemplary embodiment, as most clearly shown in FIG. 2, the first channel 54 is a circumferentially-closed channel, and the second channel 56 is a partially-circumferentially-open channel.

The first electrode 34 is electrically insulated meaning it has an electrically-conductive body which is surrounded by an electrically-insulative covering. Preferably, the body is coated or wrapped with an electrically-insulative material (such as electrically-insulative paint, a plastic tube, plastic tape, or a CVD electrically-insulating coating). The first electrode 34 has an electrically-exposed tip 36, wherein the first electrode 34 is disposable (and preferably disposed) in the first fuel hole 18 of the diesel injector nozzle workpiece 10 with the tip 36 proximate the first location 20 and with the first electrode 34 in electrical contact with the base 46 through the conduit 50 when the post 52 is so inserted in the air hole 26.

Preferably, the apparatus 12 also includes an electrically-conductive clamp 62 which is in surrounding electrical contact with the diesel injector nozzle workpiece 10 when the post 52 is so inserted in the air hole 26. In a first preferred construction (not shown in the figures), the clamp 62 is moved into such electric contact by pneumatic pressure. In a second preferred construction (shown in FIG. 2), the clamp 62 is attached to the block 48 by screws 64. Preferably, the clamp 62 consists essentially of copper. In an exemplary construction, the apparatus 12 also includes an electrical power supply 66 having a positive terminal 68 and a negative terminal 70. The positive terminal 68 is in electrical contact with the clamp 62, and the negative terminal 70 is in electrical contact with the base 46. It is noted that the power supply 66 is a DC (direct current) power supply operated in a continuous or pulsed mode.

The foregoing description of several preferred methods and embodiments of the invention has been presented for purposes of illustration. It is not intended to be exhaustive or to limit the invention to the precise form or method disclosed, and obviously many modifications and variations are possible in light of the above teaching. It is intended that the scope of the invention be defined by the claims appended hereto.

What is claimed is:

1. A method for removing burrs from a diesel injector nozzle workpiece having a gallery cavity, a smaller-diameter first fuel hole intersecting the gallery cavity at a first location, and a larger-diameter air hole spaced apart from the first fuel hole and intersecting the gallery cavity at a second location which is spaced apart from the first location, wherein the burrs are located generally at the first location, and wherein the method comprises the steps of:

a) inserting an electrically-insulated first electrode having an electrically-exposed tip into the first fuel hole such that the tip is proximate the first location;

b) directing an electrolyte flow through the air hole to the gallery cavity and then through the air hole from the gallery cavity; and c) applying a voltage potential between the first electrode and the diesel injector nozzle workpiece.

2. The method of claim 1, wherein the diesel injector nozzle workpiece also has a second fuel hole which is generally identical to and spaced apart from the first fuel hole, wherein step a) also includes the step of inserting an electrically-insulated second electrode having an electrically-exposed tip into the second fuel hole, and wherein step c) also includes the step of applying a voltage potential between the second electrode and the diesel injector nozzle workpiece.

3. The method of claim 2, wherein, during steps a) through c), the diesel injector nozzle workpiece is devoid of spray holes in fluid communication with the gallery cavity.

4. The method of claim 3, wherein the air hole has a generally cylindrical shape, a generally longitudinal axis, and a circumferential periphery, and wherein step b) includes the step of directing the electrolyte flow along the longitudinal axis through the air hole to the gallery cavity and then generally longitudinally along the circumferential periphery through the air hole from the gallery cavity.

5. The method of claim 4, wherein step b) includes the step of directing the electrolyte flow in spaced apart first and second electrolyte subflows generally longitudinally along the circumferential periphery through the air hole from the gallery cavity, wherein the first electrolyte subflow and the first fuel hole generally lie in a first plane, and wherein the second electrolyte subflow and the second fuel hole generally lie in a second plane which is different from the first plane.

6. Apparatus for removing burrs from a diesel injector nozzle workpiece having a gallery cavity, a smaller-diameter first fuel hole intersecting the gallery cavity at a first location, and a larger-diameter air hole spaced apart from the first fuel hole and intersecting the gallery cavity at a second location which is spaced apart from the first location, wherein the burrs are located generally at the first location, and wherein the apparatus comprises:

a) an electrically-conductive base;

b) an electrically-insulative block having a conduit and a post, wherein said post has separated first and second channels, wherein said block has an electrolyte entrance and an electrolyte exit, wherein said block is disposed on top of said base, wherein the diesel injector nozzle workpiece is disposable on top of said block such that said post is inserted in the air hole into the gallery cavity, and wherein, when said post is so inserted in the air hole, said first and second channels are in fluid communication with the first location, said electrolyte entrance is in fluid communication with said first channel, and said electrolyte exit is in fluid communication with said second channel; and c) an electrically-insulated first electrode having an electrically-exposed tip, wherein said first electrode is disposable in the first fuel hole of the diesel injector nozzle workpiece with said tip proximate the first location and with said first electrode in electrical contact with said base through said conduit when said post is so inserted in the air hole.

7. The apparatus of claim 6, wherein said first channel is a circumferentially-closed channel, and wherein said second channel is a partially-circumferentially-open channel.

8. The apparatus of claim 7, also including an electrically-conductive clamp which is in surrounding electrical contact with the diesel injector nozzle workpiece when said post is so inserted in the air hole.

9. The apparatus of claim 8, also including an electrical power supply having a positive terminal and a negative terminal, wherein said positive terminal is in electrical contact with said clamp, and wherein said negative terminal is in electrical contact with said base.

10. The apparatus of claim 9, wherein said base and said clamp consist essentially of copper, and wherein said block consists essentially of polyvinyl chloride.

* * * * *